May 15, 1956  C. C. DAVIS  2,745,577
COMBINATION SHAKER AND SPOUT DEVICE FOR SALT SHAKERS
Filed Oct. 16, 1953

Clayton C. Davis
INVENTOR

BY *CA Snow Co.*
ATTORNEYS.

United States Patent Office 2,745,577
Patented May 15, 1956

2,745,577

COMBINATION SHAKER AND SPOUT DEVICE FOR SALT SHAKERS

Clayton C. Davis, Denton, Tex.

Application October 16, 1953, Serial No. 386,479

5 Claims. (Cl. 222—480)

This invention relates to a combined salt shaker and spout device for inclusion in the top of a salt container.

It is a primary object of this invention to provide a combination salt shaker and spout device of the kind to be more particularly described hereinafter which may be included on or applied to a salt container whereby the salt may be shaken from the container in fine granules or may be poured from the container in a steady stream as desired by the user of the device.

It is another object of this invention to provide a combination spout and salt shaker of this kind which be readily and easily incorporated in or built into a salt container having a pouring spout already on the top wall of the container.

It is still another object of this invention to provide a combination salt shaker and spout device of this kind wherein the device may be formed at a low cost and applied to a salt container at the time of the manufacture of the container as commercially distributed salt containers having a pouring spout at the present time.

It is a further object of this invention to provide a combination salt shaker and spout device for a salt container whereby a salt shaking closure plate engages over an end of the pouring spout to preclude pouring of the salt from the container when it is desired to shake the salt from the container.

It is yet a still further object of this invention to provide a combination salt shaker and pouring spout for a salt container having a spout hingedly mounted on the top of the salt container for opening and closing the pouring opening in the spout in the top of the container and a sliding closure plate for the apertures in the top for dispensing the salt from the container by shaking the container, the closure engaging an end of the spout for securing the spout in a closed position while shaking and closing the apertures of the container with the spout in the closed position to prevent the passage of salt from the container while the container is being stored or transported in the various positions of the container in the movement during transportation.

It is another object of this invention to provide a combination shaker and spout device of the kind which may be used on a container for granular material such as sugar or granular soap.

Other and further objects and advantages of this invention will be hereinafter described and the novel features thereof defined in the appended claims.

Figure 1:
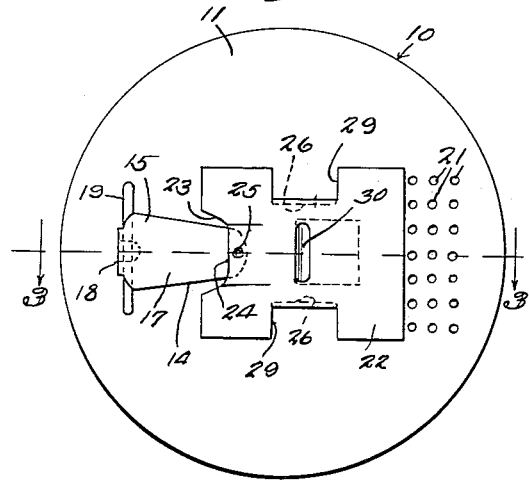
Fig. 1 is a top plan view of a granular material containing box with the combination shaker and spout device constructed according to an embodiment of my invention.
Figure 2:
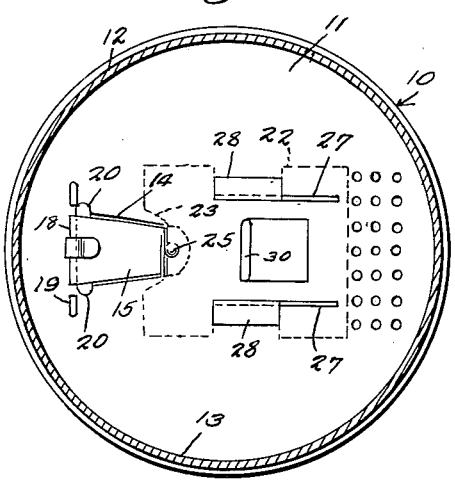
Fig. 2 is a bottom plan view of the top of the box.
Figure 3:
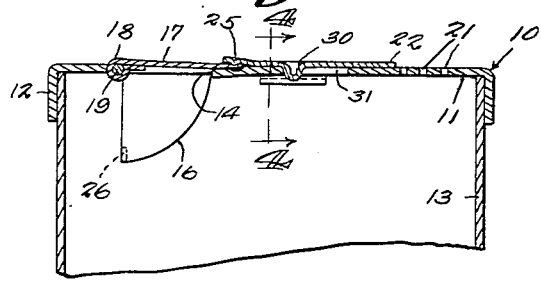
Fig. 3 is a transverse section, partly broken away, of the top of the box taken on the line 3—3 of Fig. 1.
Figure 4:
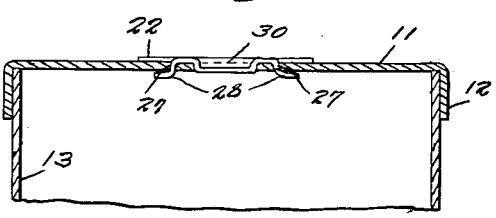
Fig. 4 is a transverse section of the top taken on the line 4—4 of Fig. 3.
Figure 5:
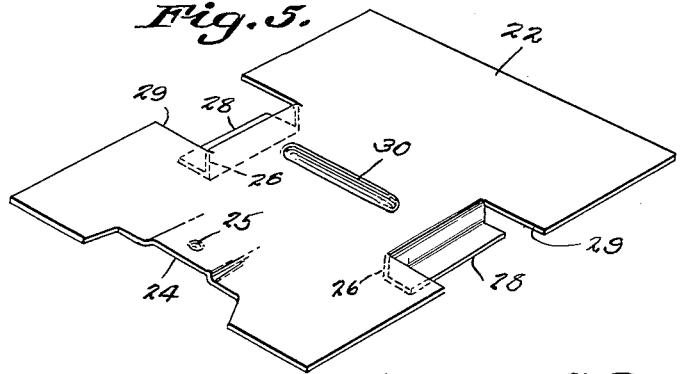
Fig. 5 is a perspective view of the shaker aperture closing plate removed from the device.

Referring to the drawings the numeral 10 designates a container having a combination shaker and spout device, constructed according to an embodiment of my invention, formed thereon so that the container may be used for filling other conventional shaker devices or the container may be used as a shaker itself without the necessity of having to fill another shaker device. Frequently, in the preparation of food, it is more desirable to shake the salt from the container in which the salt was originally deposited rather than pour the salt from the container into another shaker device and it is an object of this invention to provide a container having a pouring spout and a shaking device to accomplish both of the desired results.

The container 10 is of a paper structure having a top 11 secured on the upper edge of the side walls of the container, the top wall having a depending flange 12 about the periphery thereof for overlying the outer surface of the upper edge of the side walls of the container very much in the manner of a conventional salt container presently in use on the commercial market. The walls 13 of the container extend longitudinally of the container with the top 11 secured thereon.

A pouring opening 14 is formed in the top 11 adjacent to one side thereof through which the salt, or other granulated material may be poured, and a spout 15 is hingedly mounted on the lower surface of the top 11 for opening and closing the pouring opening 14 in the manner of present day salt containers.

The spout 15 is formed of stamped sheet metal having side walls 16 which are more or less triangular in configuration secured together by a top wall 17 with the base of the triangle being open and the top wall 17 secured on a transverse hinge 18 by a hinge pin 19 which extends through the top wall 17 of the spout and the top of the container. The side walls of the spout 15, being more or less triangular in configuration extend with upwardly and outwardly extending side edges which are curved to provide for the easy passage of the side walls of the spout 15 from the pouring opening 14 during the manual raising and lowering of the spout 15.

When the spout is pivoted to its closed position for closing the pouring opening 14, the top wall 17 of the spout, being longer than the pouring opening, will overlie a portion of the top 11 and stops 20 extend outwardly from the juncture of the side walls with the base of the triangle for engaging the lower surface of the top to limit the outward extension of the spout 15 when the spout is moved to an open position for pouring the salt in a steady stream from the container.

The top wall 11 of the container 10 is formed with a plurality of apertures 21 radially opposite from the pouring opening 14, which apertures constitute shaking apertures through which the salt in the container may be shaken when the pouring spout 15 is moved to its closed position.

A cover plate 22 is slidably mounted on the top 11 for opening and closing the shaking apertures 21, the cover plate 22 being formed from a thin sheet of metal material to cover the upper side of the top 11 and the upper opening of the apertures 21 when the cover plate is slid on the top for covering the shaking apertures.

The cover plate 22 is formed with a cutout portion 23 at one end thereof through which the spout 15 may be passed and for engaging about the spout, on the opposite sides thereof when the shaking apertures are opened and the spout is secured in its closed position for shaking the container. The cover plate 22 is formed with an upwardly inclined end 24 within the cutout 23 for overlying and securing the upwardly inclined end of the top wall of the top wall 17 of the pouring spout 15 when it is desired to secure the pouring spout in a closed position in the pouring opening 14.

Detents 25 are formed in the cover plate 22 and the top wall of the pouring spout 15 for positively securing the pouring spout below the cover plate when the cover plate is slid to a position for opening the apertures 21 and locking the pouring spout 15 in a closed position over the pouring opening 14.

A pair of cover plate segments are struck downwardly from the cover plate 22, intermediate the length thereof and slidably engage in longitudinally extending parallel slots 27 in the top 11 for sliding the cover plate 22 longitudinally of the cover plate on the top to a position opening the apertures 21 and securing the spout 15 in its closed position.

Flanges 28 are formed on the lower end of each of the cover plate segments 26 and are disposed below the lower surface of the top 11 for securing the cover plate 22 against vertical movement, accidentally as in transportation, and providing for the longitudinal sliding movement of the cover plate 22. As the depending cover plate segment 26 and flanges 28 are struck from the cover plate 22, a cutout portion 29 is formed along the longitudinal side edges of the cover plate. In the formation of the cover plate a transverse groove 30 is formed on the surface of the cover plate 22 and depends from the cover plate into a cutout 31 in the top 11 so that the depending, struck out groove, forms a stop engaging the opposite ends of the cutout to limit the longitudinal sliding movement of the cover plate. The groove 30 provides for the sliding movement of the cover plate by a finger of a person desiring to move the cover plate one way or the other on the top 11 of the container 10.

In the use and operation of the combination shaker and spout device of my invention, the container is initially filled with granular material, as salt, and the spout 15 is pivoted to a position closing the pouring opening 14 and the cover plate 22 is slid to a position covering the pouring openings or apertures 21 so that the container may be shipped from one place to another without losing any of the granular material from the container during transportation, or storing of the container. A suitable paper seal, not shown in the drawings, may be used for securing the cover plate and the spout in their closed positions to be later broken by a person desiring to dispense the granular material from the container.

When it is desired to pour the granular material from the container, the cover plate is left in a position covering the apertures while the pouring spout 15 is pivoted to a position opening the pouring opening 14. When it is desired to sprinkle or shake the granular material from the container 10, the spout 15 is pivoted to a position closing the pouring opening 14 and the cover plate 25 is slid to a position for opening the apertures 21 and securing the spout 15 in its pouring opening closed position so that the granular material may be dispensed only through the apertures 21.

While the specific details of one embodiment of this invention have been herein shown and described, the invention is not confined thereto as changes and alterations may be made without departing from the spirit and scope thereof as defined in the appended claims.

I claim:

1. A combination shaker and spout device for a container of granular material having a top thereon, said top being formed with a pouring opening therethrough, a pouring spout hinged on said top movable from an outwardly extending pouring position in said opening to an overlying position on said opening in an opening closing position, said top having a plurality of shaker openings therethrough adjacent said pouring opening and spout, a shaker opening cover plate slidable on the upper surface of said top for opening and closing said shaker openings, said shaker opening cover plate engaging over an edge of said spout, remote from said shaker openings, for securing said spout in a closed position over said pouring opening in the shaker open position of said shaker opening cover plate.

2. A combination shaker and spout device for the top of a container of granular material having a pouring opening therethrough and a plurality of shaker openings adjacent said pouring opening, a pouring spout pivoted on the top for opening and closing said pouring opening, a cover plate slidable on the upper surface of said top for opening and closing said shaker openings and engageable with said spout in the closed position thereof for securing said spout in closed position over said pouring opening with said plate in the shaker open position.

3. The combination shaker and spout device as set forth in claim 2 including L-shaped sliding guide means carried by said plate engageable through said top.

4. The combination shaker and spout device as set forth in claim 2 including parallel slots in said top opening transversely of said top extending between and from said pouring opening toward said shaking openings on the opposite sides thereof, a depending guide plate segment on said plate extending through each of said slots and a flange on each of said plate segments underlying said top for slidably securing said cover plate on said top.

5. The combination shaker and spout device as set forth in claim 2 including an upwardly extending inclined edge on one end of said cover plate engageable over one end edge of said spout for holding said plate and said spout together with the spout in the pouring opening closed position and said closure plate with the shaker openings in open position and interengaging resilient detents on said spout and said plate for securing said spout on an edge of said plate.

References Cited in the file of this patent

UNITED STATES PATENTS

| | | |
|---|---|---|
| 1,737,860 | Mills | Dec. 3, 1929 |
| 1,959,874 | Mills | May 22, 1934 |
| 2,041,024 | Rueger | May 19, 1936 |